United States Patent
Leethaus et al.

(10) Patent No.: US 10,344,818 B2
(45) Date of Patent: Jul. 9, 2019

(54) ARTICLE, PARTICULARLY AN AIR SPRING BELLOWS, A METAL-RUBBER ELEMENT, OR A VIBRATION DAMPER

(71) Applicant: ContiTech Luftfedersysteme GmbH, Hannover (DE)

(72) Inventors: Thorsten Leethaus, Eschershausen (DE); Christoph Zander, Grosshansdorf (DE); Mark Lindenberg, Garbsen (DE); Claus-Lueder Mahnken, Ahausen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 15/760,234

(22) PCT Filed: Jun. 13, 2016

(86) PCT No.: PCT/EP2016/063468
§ 371 (c)(1),
(2) Date: Mar. 15, 2018

(87) PCT Pub. No.: WO2017/045785
PCT Pub. Date: Mar. 23, 2017

(65) Prior Publication Data
US 2018/0259027 A1 Sep. 13, 2018

(30) Foreign Application Priority Data
Sep. 17, 2015 (DE) .......................... 10 2015 217 881

(51) Int. Cl.
*F16F 9/04* (2006.01)
*C09J 9/00* (2006.01)
(Continued)

(52) U.S. Cl.
CPC .............. *F16F 9/0409* (2013.01); *C09J 9/00* (2013.01); *C09J 11/04* (2013.01); *C09J 175/00* (2013.01);
(Continued)

(58) Field of Classification Search
CPC ............ F16F 9/0409; F16F 2230/0023; F16F 2224/0208; F16F 2224/0241;
(Continued)

(56) References Cited

U.S. PATENT DOCUMENTS 7,128,674 B2 * 10/2006 Teves ........................ F16G 1/06
474/238

FOREIGN PATENT DOCUMENTS

| CN | 1144252 A | 3/1997 |
| DE | 102009044533 A1 | 5/2011 |

(Continued)

OTHER PUBLICATIONS

International Search Report dated Oct. 6, 2016 of international application PCT/EP2016/063468 on which this application is based.

*Primary Examiner* — Michael C Miggins
(74) *Attorney, Agent, or Firm* — David L. Cate

(57) ABSTRACT

The invention relates to an article (1) having a main body composed of a polymeric material having elastic properties, in particular an air spring bellows (1), a metal-rubber element or a vibration damper.
In order to improve its fire-retardant and/or flame-retardant properties, the article has been provided partially or completely with a flock (9).

14 Claims, 2 Drawing Sheets

(51) Int. Cl.
*C09J 11/04* (2006.01)
*C09J 175/00* (2006.01)
*C08K 3/08* (2006.01)
*C08K 3/40* (2006.01)
*C08K 7/28* (2006.01)
*F16G 1/06* (2006.01)

(52) U.S. Cl.
CPC .......... *C08K 3/08* (2013.01); *C08K 3/40* (2013.01); *C08K 7/28* (2013.01); *F16F 2224/025* (2013.01); *F16F 2224/0208* (2013.01); *F16F 2224/0241* (2013.01); *F16F 2226/02* (2013.01); *F16F 2230/0023* (2013.01); *F16F 2230/48* (2013.01); *F16G 1/06* (2013.01)

(58) Field of Classification Search
CPC ... F16F 2224/025; F16F 2226/02; F16G 1/08; F16G 5/08; F16G 1/06; C09J 9/00; C09J 11/04; C09J 175/00; C08K 3/08; C08K 3/40; C08K 7/28
See application file for complete search history.

(56) References Cited

FOREIGN PATENT DOCUMENTS

| | | | |
|---|---|---|---|
| DE | 102011002230 | A1 | 10/2012 |
| EP | 2549143 | A1 | 1/2013 |
| WO | 151221 | A1 | 7/2001 |
| WO | 0175330 | A1 | 10/2001 |

\* cited by examiner

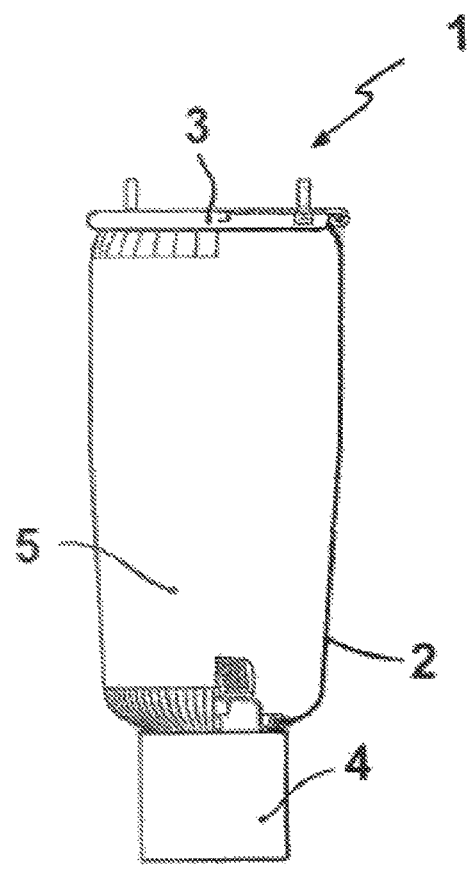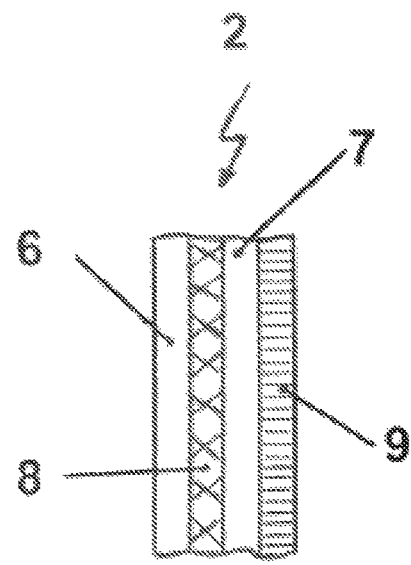
Fig. 1
Fig. 2

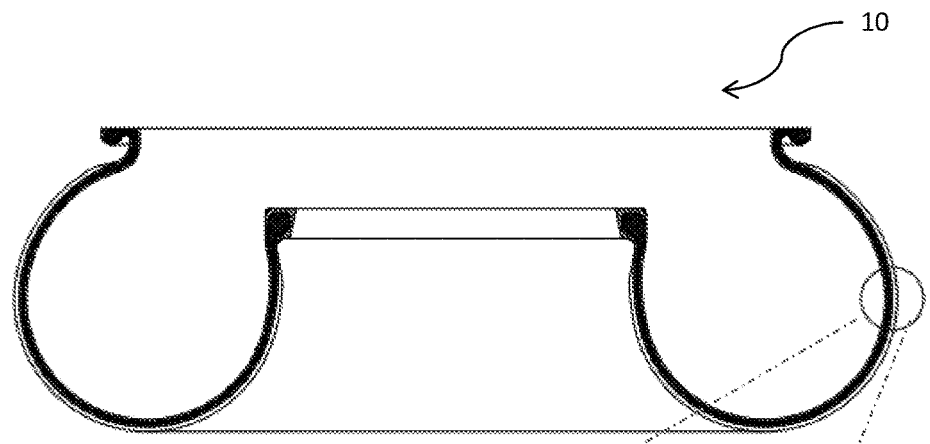
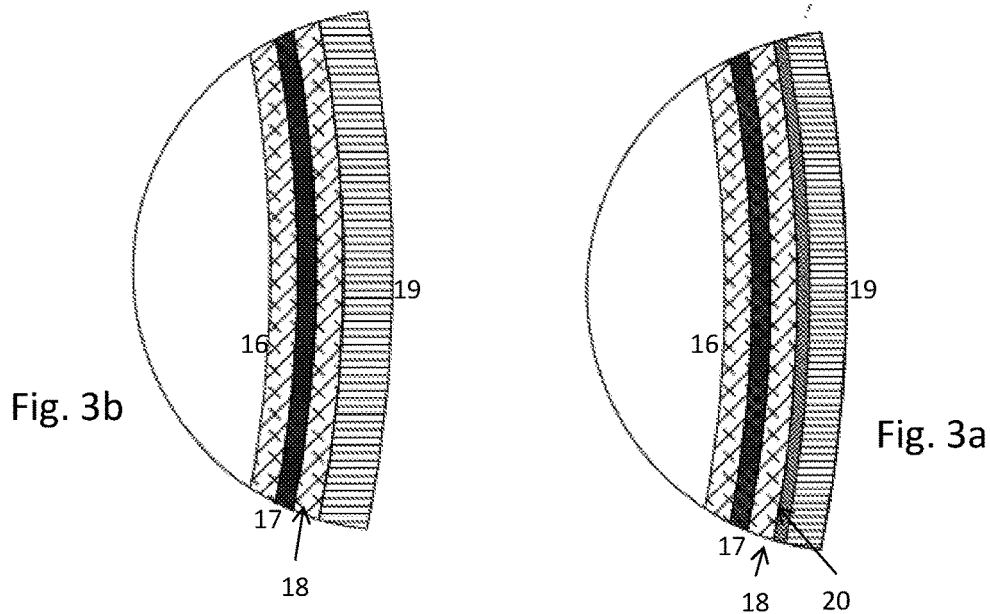

ARTICLE, PARTICULARLY AN AIR SPRING BELLOWS, A METAL-RUBBER ELEMENT, OR A VIBRATION DAMPER

The invention relates to an article having a main body composed of a polymeric material having elastic properties, in particular an air spring bellows, a metal-rubber element or a vibration damper.

Polymeric articles used for the suspension of, for example, motor vehicles or track vehicles and/or vibration damping are made using elastomeric mixtures, also known as rubber mixtures. These elastomeric mixtures typically used for the fundamental properties of such articles are well known. Articles having outstanding elastic properties, for example metal-rubber elements or vibration dampers, preferentially contain vulcanized mixtures of rubber which are predominantly based on natural rubber (NR) and/or polyisoprene rubber (IR). Articles having very good resistance to weathering, mineral oil and heat, examples being air spring bellows, preferentially contain vulcanized mixtures of rubber which are predominantly based on chloroprene rubber (CR).

However, articles comprising these elastomeric mixtures display distinct disadvantages in fire behavior. The evolution of thick smoke is one of the consequences of a fire. The heat release rate is particularly high in the combustion process of those of the aforementioned elastomeric mixtures which are predominantly based on NR and/or IR. The evolving smoke from the combustion process of elastomeric mixtures based predominantly on CR is toxic to humans and animals.

The recent increase in fire protection requirements as reflected above all in the tightened fire protection standard EN 45545 is driving an increased need for polymer articles optimized in fire protection. These fire protection requirements are no longer met either by the aforementioned elastomeric mixtures that are predominantly based on NR and/or IR, above all because of the required maximum heat release rate, but also the flame-resistant elastomeric mixtures that are predominantly based on CR, particularly because of the required smoke toxicity. Articles comprising these elastomeric mixtures thus usually no longer meet the tightened requirements.

A usual way to improve the fire behaviour of rubber mixtures is to directly incorporate fire-retardant substances. However, the general consequence of taking this measure with the articles in question is that there is a significant deterioration in their physical properties, particularly the suspension, setting and/or vibration properties. Even fire protection coatings as described in WO 2014/019008 A1 or else in EP 2196492 B1 are only of limited suitability for assuring lasting fire protection of the article. Their low tear resistance is disadvantageous for good stability to cracking or detachment. Their high compression set particularly at relatively high temperatures is disadvantageous for the suspension, setting and vibration properties of the articles. Any second vulcanization process that may be necessary in the production of the end products particularly reduces the tear propagation resistance of the mixture of the main body owing to the usual tendency to reversion. The use of a fire protection coating based solely on expandable graphites also shows disadvantages in terms of adhesion and also in processing. Expandable graphites themselves expand only at relatively high temperatures, and so there is no insulating effect until relatively high temperatures either. There are various types of expandable graphites that have different onset temperatures for the commencement of expansion. However, the onset temperature, according to the type, is between 140° C. and 280° C.

The invention then has for its object to provide an article having an optimized fire protection behaviour to meet the tightened requirements, particularly those described in EN 45545. At the same time the required physical characteristics of the article shall remain at a similar level and the complexity in the production process shall not be significantly increased. The article shall already have sufficiently good fire protection characteristics even at relatively low temperatures, possibly below the onset temperature of expandable graphites. This object is achieved in that the article having a main body composed of a polymeric material having elastic properties has an article surface provided completely or partially with at least one flock.

According to DIN 60 0001_2:1990, a flock is understood to mean the following: "short synthetic fibers that are not intended for spinning but are processible by other methods, which are produced in a specific manner (according to DIN 60 000)." The standard ISO 8159:1987 under 3.12 gives the following definition of a flock: "very short fibres destined to be stuck to a backing".

According to DIN 60 000:1969, flock textiles are understood to mean sheetlike fabrics formed by bonding of textile fibers at one of their ends to a textile or nontextile carrier by an adhesive.

"Partially" in this context means that merely certain, defined regions and/or portions of the article surface of the overall article are provided with the flock. The overall article has thus been partially and/or completely flocked with at least one fiber material.

The structure and/or the material of the flocking, even at temperatures below the onset temperatures of expandable graphites, result(s) in improved fire and flame protection in the form of lower flammability.

The fiber materials used for the flock may be any of the fibers known to a person skilled in the art.

Textile fibers used for the flock may preferably be fibers of synthetic polymers, for example polyacrylonitrile, polypropylene, polyester, polyamide, polyurethane, polyphenylene sulfide, polyoxadiazole, aramids such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polyvinyl alcohol, or else fibers of natural polymers, for example regenerated cellulose-based fibers such as viscose, lyocell or rubber.

In addition, textile fibers used may preferably be natural fibers. These may be mineral-type natural fibers, for example rockwool or asbestos fibers, or vegetable-type natural fibers, for example of cotton, flax or hemp, or else animal-type natural fibers, for example wool or silk.

It is similarly conceivable to use textile fibers composed of inorganics such as glass, ceramic, carbon, metal or rock, for example basalt.

The textile fibers may be used alone or in combination, i.e., as a hybrid fiber.

It is preferable when fibers or textile fibers used for the flock are those which intrinsically offer adequate fire protection or intrinsically have adequate flame retardancy, for example polyoxadiazole, polyetherimide, aramids such as m-aramid, p-aramid or copoly-para-aramid, metal, glass, ceramic, rock, carbon, modified polyester, modified viscose. The recited materials are usable alone or in combination, for example as a hybrid yarn. For further optimization of the fire protection characteristics, the flock may additionally at least have had a reflective substance vapor-deposited, i.e. sputtered, on its surface. Owing to the reflection of heat which results from the use of a reflective substance, the mixture to be protected beneath heats up less quickly. As a result, especially on commencement of elevated thermal stress, the temperature of the surface of the article beneath, which is to be protected, is lower. This delays the additional release of heat and the formation of both dense and toxic smoke gases.

If the reflective substance comprises metal particles, for example of aluminum or other suitable metals, the surface of the article is additionally protected from ignition.

As already mentioned above, the flock is generally applied to the surface to be flocked with the aid of a flocking adhesive, such that the article surface is provided partially or completely not just with a flock but additionally also partially or completely with a flocking adhesive.

Rather than the flocking adhesive, it is alternatively also possible to use a composition based on at least one isocyanate in accordance with DE 10 2009 044 533 A1.

In a particularly preferred embodiment, the flocking adhesive and/or the composition based on at least one isocyanate, for further optimization of the fire protection behavior and/or of the low flammability, comprises at least one fire-retardant substance.

Fire-retardant substances used for the flocking adhesive and/or for the composition based on at least one isocyanate may be flame retardants, but may also include substances such as glass microbeads and/or hollow glass microbeads that have preferably been prepared so as to facilitate adhesion, and/or hollow plastic beads having a flexible polymer shell and/or reflective substances, for example metal particles, especially of aluminum and/or brass.

The glass microbeads and/or the hollow glass microbeads melt in the event of fire and form vitreous, insulating layers. If they are hollow beads, preferably hollow glass microbeads, in a preferred variant, there may be fire-retardant substances encapsulated in the hollow beads themselves, which are released after the outer shell has melted and then have an additional fire-retardant effect in concentrated form.

The hollow plastic beads in particular may be in already expanded form and/or in expandable form.

In a preferred embodiment, expandable hollow plastic beads are used. A gas is encapsulated in the expandable hollow plastic beads. When heat is supplied, there is an increase in the gas pressure within the shell, which simultaneously softens. The associated increase in volume leads to an increase in the layer thickness, which leads to a further insulating effect even before the actual fire. This increase in volume already proceeds at temperatures much lower than the customary onset temperatures of the expandable graphites.

Flame retardants used for the flocking adhesive and/or for the composition based on at least one isocyanate may be any of the flame retardants known to a person skilled in the art.

Materials that can be used here are in particular stannates, such as zinc stannate or zinc hydroxystannate, hydroxides, such as magnesium hydroxide or aluminum hydroxide, cyanurates, such as melamine cyanurate, borates, such as zinc borate, phosphorus-containing components, such as resorcinol diphosphate or aromatic polyphosphates, nitrogen-containing components, such as ammonium phosphate, carbonates, such as calcium carbonate or magnesium carbonate, expandable graphite or intumescent mixtures. Intumescent mixtures expand to give foams. They are used to provide protection from the effects of heat and fire to combustible materials such as plastics or wood, and also steel, which suffers a loss of strength at elevated temperature.

Optionally, small amounts of antimony trioxide may also be additionally used, despite the hazard to health, in combination with at least one of the recited flame retardants. The fire-retardant substances may each be used alone or in combination.

In a preferred embodiment, the flock is applied to the surface of the as yet unvulcanized raw article prior to the actual vulcanization process. What is advantageous here is that, in the first phase of the vulcanization process, called the flow phase (=forming phase), both proportions of the fiber flock and proportions of the constituents of the flocking adhesive and/or of the composition based on the isocyanate can penetrate, i.e. flow, into the main body beneath, composed of a polymeric material, which is to be protected. This once again improves the adhesion of the flock to the main body, especially because this at least partly enables anchoring of the fibers of the flock directly to the main body. Especially in the case of use of a composition based on isocyanate, for example according to DE 10 2009 044 533 A1, the crosslinking reaction of this composition advances further at the vulcanization temperatures that are customary in the rubber industry, which is advantageously manifested in better adhesion of the flock and particularly in improved abrasion resistance of the flock structure.

In some cases, it is also possible to apply the flock to an already ready-vulcanized article with the aid of the flocking adhesive and/or the composition based on isocyanate. This has the advantage that even finished articles can be rendered fire-retardant subsequently. In order to further improve the adhesion here, it is advantageous to clean and optionally to activate the already vulcanized rubber surface.

The flock is employed for the following articles in particular:

Tubular Bodies
  Tubular bodies include the product group of feed hoses of any kind, air spring bellows (cross-ply bellows, axial bellows) and compensators in various embodiments (e.g., torsion compensator, lateral compensator).
  The design concept here is in all cases the same, namely comprising an outer layer (a sheath), an inner layer (a core) and also more particularly an embedded single- or multi-ply strength member. There may additionally be present at least one interlayer, for example between two strength member plies. In the case of feed hoses, the inner layer may additionally display a media-resistant inliner, for example in the form of a PTFE film, for example in the case of hoses for feeding chemicals. An additional barrier layer having a low rate of permeation may also be present, in particular in the form of films, for example as polyamide film, in which case air conditioning hoses may be mentioned here in particular. The outer layer of a tubular body, more particularly the entire surface of the outer layer, is provided with the flock.

Drive Belt
  Drive belts, which are usually provided with an embedded strength member having tensile members (tensile strands) in a parallel arrangement in the longitudinal direction, occur in various forms, namely as flat belts, V-belts, V-ribbed belts, toothed belts and composite ropes each having a substructure with a power transmission zone and a top ply as belt backing. The essential difference resides in the construction of the power transmission zone, due to different surface geometries, for example due to a tooth-shaped profiling in the case of toothed belts. The flock is used particularly in the power transmission zone, optionally additionally also in the top ply. The flock may further be used in addition to the flame-retardant edge-sealing system.

Damping Element of a Bearing, of a Bushing or of a Multilayered Spring, Cone Spring The damping element comprises a polymeric material having elastic properties and is usually employed as part of a metal-polymer composite, in the form of a bearing having an upper bearing part and a lower bearing part, a bushing featuring core and sleeve or a metal-rubber spring element, such as, for example, a multilayered or cone spring. It is preferable here for all free surfaces of the damping element to be provided with the flock.

Particular importance attaches to the air spring bellows more particularly presented hereinafter in connection with the description of the figures.

To form the main body, it is particularly (partially) vulcanizable polymeric mixtures which are used, the following two variants of material being recited on account of their elastic properties:

Variant A (Elastomers)

The polymer mixture is a rubber mixture which is vulcanizable, and thermoplastic-free and comprises at least one rubber component and further mixing ingredients. Useful rubber components include in particular: ethylene-propylene rubber (EPM), ethylene-propylene-diene monomer rubber (EPDM), nitrile rubber (NBR), (partially) hydrogenated nitrile rubber (HNBR), fluoro rubber (FKM), chloroprene rubber (CR), natural rubber (NR), styrene-butadiene rubber (SBR), isoprene rubber (IR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin (ECO), terpolymers of ECO with ethylene oxide and unsaturated monomers (ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU).

The aforementioned types of rubber may be uncut. It is similarly possible to use a blend, in particular in conjunction with one of the aforementioned types of rubber, examples being an NR/BR blend or a BR/SBR blend.

Which type of rubber is preferred depends on the nature of the article. The use of various types of rubber is particularly diverse in the case of tubular bodies for which the following rubber components may be mentioned here in particular: NR, IR, ACM, AEM, BIMS, CM, CSM, CR, IIR, BIIR, CIIR, ECO, EPM, EPDM, ETER, EVA, FKM, HNBR, VMQ or FVMQ. Drive belts utilize particularly rubber mixtures based on EPM and/or EPDM, ACSM (in the case of V- and V-ribbed belts) and also NBR, but specifically HNBR, but also XNBR or NXBR (in the case of toothed belts).

Mixing ingredients of the customary type include at least one crosslinker or crosslinker system (crosslinking agent plus accelerator). Additional mixing ingredients usually yet include a filler and/or a processing aid and/or a plasticizer and/or an antioxidant and also optionally further additives (e.g., color pigments, reinforcing fibers). In this regard, reference is made to the general art of rubber mixing technology.

Variant B (Thermoplastic Elastomers)

The polymer mixture is a part-vulcanizable polymer mixture comprising at least one thermoplastic component, at least one rubber component, which is at least part-crosslinkable, and also further mixing ingredients. The preferred thermoplastic components are: polyolefin, especially polyethylene (PE) or polypropylene (PP), polystyrene (PS), polyamide (PA), for example PA6 or PA66, polyester, for example PET, PEN or PBT.

Useful rubber components here include particularly EPM, EPDM, SBR, CR, NR, NBR, FKM, ACM or AEM, which are more particularly not blended with any further rubber component.

The usual mixing ingredients pertaining, reference is made to the mixing technology relating to variant A, particularly to the teaching as per Offenlegungsschrift DE 100 04 632 A1.

The invention is now more particularly described by means of exemplary embodiments with reference to schematic drawings. The figures show:

FIG. 1 an air spring arrangement;

FIG. 2 the layer structure of an air spring bellows with a flock of the invention.

FIG. 3 a section through a vibration damper

FIG. 1 shows an air spring arrangement 1 comprising an air spring bellows 2 and also the two connection components in the form of lid 3 and rolling piston 4, to form an elastic-volume air chamber 5.

FIG. 2 then shows the layer structure of a finalized air spring bellows 2. This air spring bellows consists of an inner layer 6 and an outer layer 7 as elastic main body, for example composed of a vulcanized mixture of rubber based on NR, a strength member layer 8, for example in the form of a polyamide weave, embedded between the inner layer 6 and the outer layer 7, and also of a cover 9, which is in direct contact with the outer layer 8. The flock 9 was applied with a flocking adhesive containing flame-retardant substances.

FIG. 3 shows a section through a vibration damper 10. The detail in the circle from FIG. 3 is shown in detail in FIGS. 3a and 3b. Between the inner layer 16 and the outer layer 17 is an embedded strength member layer 18, for example in the form of a polyamide weave.

The flock 19 was applied with a flocking adhesive 20 in FIG. 3a and without a flocking adhesive in FIG. 3b.

LIST OF REFERENCE SIGNS

Part of the Description 1 air spring arrangement
2 air spring bellows
3 cover
4 rolling piston
5 elastic-volume air chamber
6 inner layer of an air spring bellows
7 outer layer of an air spring bellows
8 strength member layer of an air spring bellows
9 flock
10 damping element
16 inner layer of a damping element
17 outer layer of a damping element
18 strength member layer of a damping element
19 flock
20 flocking adhesive

The invention claimed is:

1. An article comprising a main body composed of a polymeric material having elastic properties, wherein part of a surface of the article has been provided with at least one flock;
   wherein the flock is applied to the surface of the article in at least one process step with the aid of at least one flocking adhesive and/or with the aid of at least one composition based on at least one isocyanate; and,
   wherein the flocking adhesive and/or the composition based on at least one isocyanate comprise(s) glass microbeads and/or hollow glass microbeads.

2. The article according to claim 1 wherein the flock is intrinsically fire-retardant and/or flame-retardant.

3. The article according to claim 1 wherein the flocking adhesive and/or the composition based on at least one isocyanate comprises at least one fire-retardant substance.

4. The article according to claim 1 wherein the flocking adhesive and/or the composition based on at least one isocyanate comprise(s) hollow glass microbeads comprising fire-retardant substances encapsulated therein.

5. The article according to claim 1 wherein the flock further comprises a reflective substance vapor-deposited on a surface of the flock.

6. The article according to claim 5 wherein the reflective substance delays release of heat and formation of both dense and toxic smoke gases.

7. The article according to claim 5 wherein the reflective substance comprises metal particles.

8. An article comprising a main body composed of a polymeric material having elastic properties, wherein in that all of the article surface has been provided with at least one flock;
   wherein the flock is applied to the surface of the article in at least one process step with the aid of at least one flocking adhesive and/or with the aid of at least one composition based on at least one isocyanate; and,
   wherein the flocking adhesive and/or the composition based on at least one isocyanate comprise(s) glass microbeads and/or hollow glass microbeads.

9. The article according to claim 8 wherein the flock is intrinsically fire-retardant and/or flame-retardant.

10. The article according to claim 8 wherein the flocking adhesive and/or the composition based on at least one isocyanate comprises at least one fire-retardant sub stance.

11. The article according to claim 8 wherein the flocking adhesive and/or the composition based on at least one isocyanate comprise(s) hollow glass microbeads comprising fire-retardant substances encapsulated therein.

12. The article according to claim 8 wherein the flock further comprises a reflective substance vapor-deposited on a surface of the flock.

13. The article according to claim 12 wherein the reflective substance delays release of heat and formation of both dense and toxic smoke gases.

14. The article according to claim 12 wherein the reflective substance comprises metal particles.

* * * * *